United States Patent [19]

Kim

[11] Patent Number: 5,714,770

[45] Date of Patent: Feb. 3, 1998

[54] THIN FILM TRANSISTOR SUBSTRATE FOR A LIQUID CRYSTAL DISPLAY

[75] Inventor: Nam-Deog Kim, Seoul, Rep. of Korea

[73] Assignee: Samsung Electronics Co., Ltd., Suwon, Rep. of Korea

[21] Appl. No.: 749,974

[22] Filed: Nov. 14, 1996

[30] Foreign Application Priority Data

Dec. 5, 1995 [KR] Rep. of Korea .................. 95-46790

[51] Int. Cl.$^6$ .................. H01L 29/04; H01L 31/036
[52] U.S. Cl. .................. 257/59; 257/72; 349/40; 349/54; 349/192
[58] Field of Search .................. 349/40, 54, 117, 349/139, 149, 152, 192; 257/59, 72

[56] References Cited

U.S. PATENT DOCUMENTS 5,233,448  8/1993  Wu .................. 349/40
5,373,377  12/1994  Ogawa et al. .................. 349/40
5,396,353  3/1995  Takahashi et al. .................. 349/54

Primary Examiner—Tom Thomas
Assistant Examiner—Fetsum Abraham
Attorney, Agent, or Firm—Cushman, Darby & Cusahman IP Group of Pillsbury Madison & Sutro LLP

[57] ABSTRACT

A thin film transistor liquid crystal display compensates for differences in optical brightness of pixels associated with normal data lines and repaired data lines. The display includes signal delay elements formed in the signal receiving portions of the data lines so as to provide a built-in signal delay to match the signal delays created in the display arising when data lines are repaired. Auxiliary signal lines are formed in parallel with, but initially insulated from, the signal delay elements. When a data line is repaired, the auxiliary data line is shorted across the terminals of the signal delay element so as to remove that source of delay from the repaired data line signal path. Preferably, the signal delay through the repaired data line without a signal delay element in its path will be about the same as a normal data line with a signal delay element.

13 Claims, 2 Drawing Sheets

THIN FILM TRANSISTOR SUBSTRATE FOR A LIQUID CRYSTAL DISPLAY

BACKGROUND OF THE INVENTION

1. Field of the Invention

The present invention relates to a thin film transistor (TFT) liquid crystal display (LCD). More particularly, the present invention relates to a TFT-LCD in which signal delay elements are formed in the signal receiving portions of data lines to compensate for loss of data synchronization between pixels arising from repairs performed on defective data lines.

2. Description of the Related Art

Liquid crystal displays (LCDs) typically include a plurality of pixels including a thin film transistor and a pixel electrode formed in procession, a thin film transistor (TFT) substrate, that is, the upper substrate of the LCD in which gate lines and data lines are formed along rows and columns of pixels, a color filter substrate, which is the lower substrate of the LCD, in which a common electrode is formed, and liquid crystal material injected between the upper and lower substrates.

A gate electrode in the TFT substrate receives a gate driving signal from a gate driver through the gate lines and forms a channel in a semiconductor layer, whereby a data signal from a data driver is transmitted to a source electrode through the data lines, and transmitted to the pixel electrode thereof through the semiconductor layer and a drain electrode thereof.

Often, an electrical open in one or more of the data lines occurs in the TFT substrate of the LCD, thereby decreasing LCD productivity. Accordingly, the opened portions of the data lines should be repaired so as to restore the usefulness of the display.

FIG. 1 illustrates a data repair line in a conventional TFT substrate of a LCD. As shown in FIG. 1, the conventional repair line 2 surrounds an active region having a plurality of pixels. A method for repairing a conventional TFT substrate of a LCD will herein be described in detail with reference to FIG. 1.

When an open in the data line 4 occurs in portion A, the data line is repaired by shorting it together with repair line 2, at portions B and C where the data line and repair line cross, using a laser. However, a resistance-capacitance (RC) delay in the repair line 2 is created due to additional capacitance formed in the portions where the two lines are crossed. This signal delay becomes an even more serious problem when the LCD is intended as a high quality display and when the LCD has a large screen.

SUMMARY OF THE INVENTION

Accordingly, the object of the present invention is to provide a thin film transistor liquid crystal display (TFT-LCD) which compensates for signal delays created between data lines in the display due to RC delays arising from data line repair operations, so as to substantially obviate the limitations and disadvantages associated with the prior art.

To achieve this and other objects, and in accordance with the purpose of the invention, as embodied and broadly described herein, the thin film transistor for a liquid crystal display comprises signal delay elements formed in the signal receiving portions of the data lines so as to provide a built-in signal delay to match the signal delays created in the display arising when data lines are repaired. Auxiliary signal lines are formed in parallel with, but initially insulated from the signal delay elements. When a data line is repaired, the auxiliary data line is shorted across the terminals of the signal delay element so as to remove that source of delay from the repaired data line signal path. Preferably, the signal delay through the repaired data line without a signal delay element in its path will be about the same as a normal data line with a signal delay element.

Additional objects and advantages of the invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings serve to illustrate the disclosed embodiments of the invention and, together with the detailed description, explain the principles of the invention. In the drawings.

DESCRIPTION OF THE PREFERRED EMBODIMENTS

Description will now be made in detail of the preferred embodiments of the present invention, examples of which are illustrated in the accompanying drawings. Wherever possible, the same reference numbers will be used throughout the drawings to refer to the same or like elements.

Figure 1:
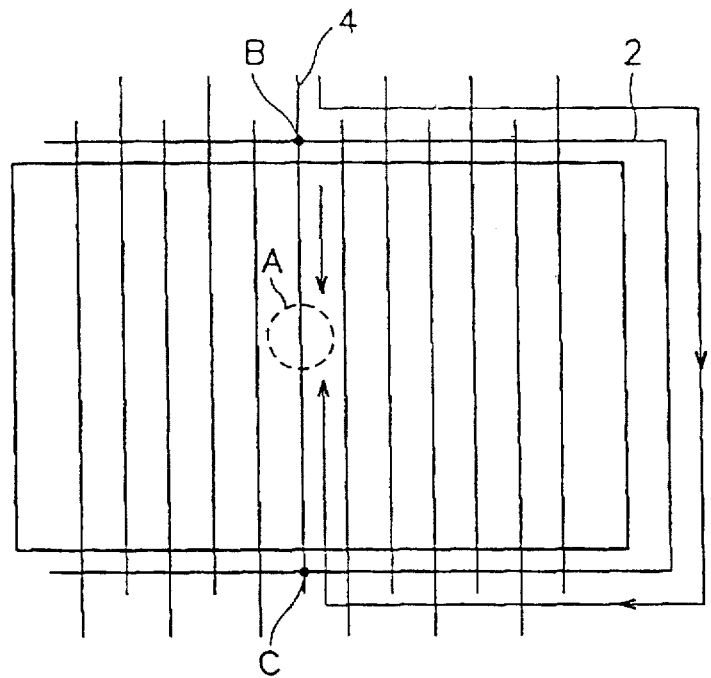
FIG. 1 is a plan view illustrating a repair line of a conventional TFT substrate of a LCD.
Figure 2:
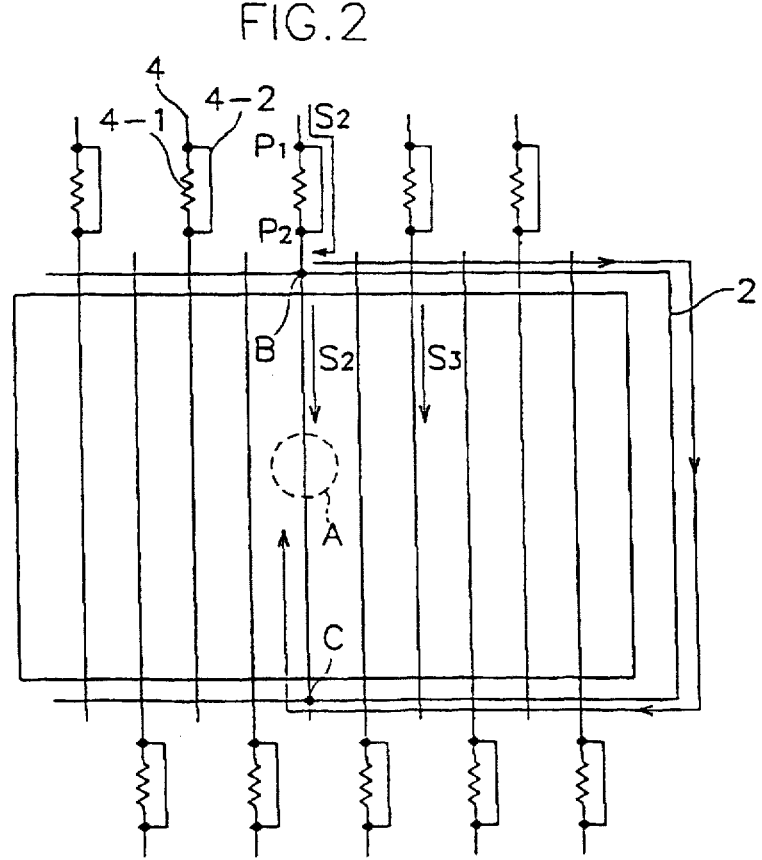
FIG. 2 is a plan view illustrating a repair line of a TFT substrate for an LCD in accordance with a first preferred embodiment of the present invention.
Figure 3:
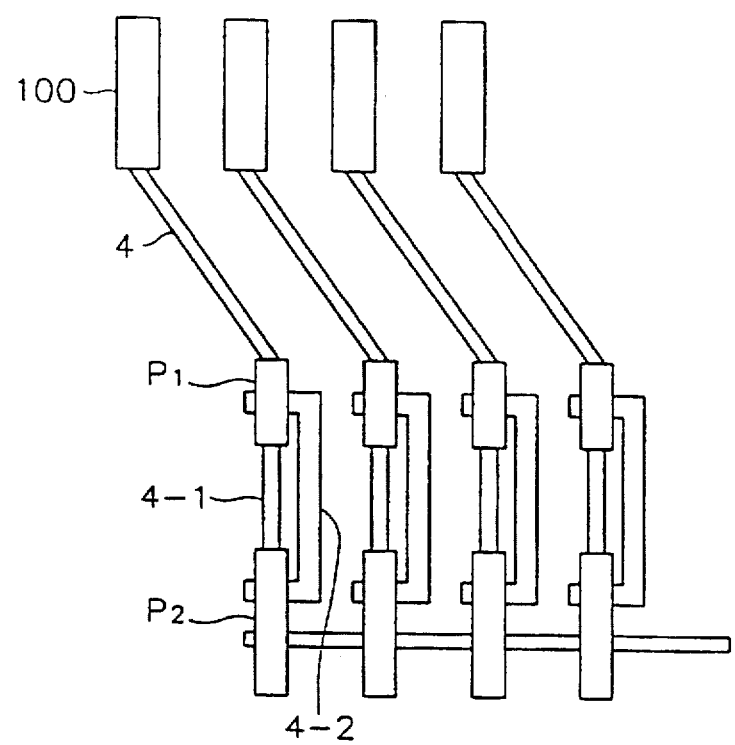
FIG. 3 is a plan view illustrating signal receiving portions of data lines in a TFT substrate for an LCD in accordance with a first preferred embodiment of the present invention.

As shown in FIGS. 2 and 3, the LCD includes a plurality of pixels surrounded by a repair line 2, and in which a signal resistance block 4-1 having a predetermined resistance value is electrically connected to a data line 4 at a signal receiving portion of the data line 4 where it is connected to a data driver 100, and an auxiliary signal line 4-2 is electrically insulated from the signal resistance block 4-1 via an insulator layer (not shown). The signal resistance block 4-1 may be formed of indium tin oxide ITO, and the auxiliary signal line 4-2 may be formed of the same material as the repair line. Moreover, the auxiliary signal line 4-2 may be formed of a low-resistance material.

When an open occurs in portion A in FIG. 2, portion B and portion C are operated on by a laser so as to short the data line to the repair line, and portion P1 and portion P2 are also operated on by the laser so as to short the auxiliary signal line 4-2 in place of the signal resistance block 4-1 between the data line and the repair line.

Thereafter, when a picture signal S2 is transmitted to a pixel along the repair line 2 through the auxiliary signal line 4-2, after being repaired, it arrives there at the same time as would a picture signal S3 transmitted to another pixel through the normal data line 4 and the signal resistance block 4-1. That is, data display synchronization among all pixels of the display is maintained by compensating for the different signal delays between repaired and non-repaired data lines caused by the different resistances-capacitances associated therewith.

Figure 4:
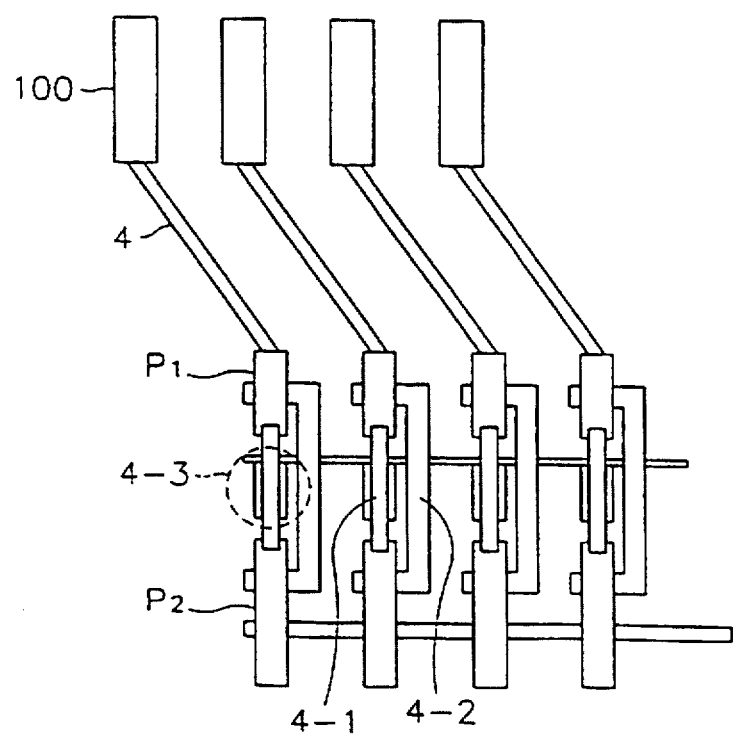
FIG. 4 is a plan view illustrating signal receiving portions of data lines in a TFT substrate for an LCD in accordance with a second preferred embodiment of the present invention.

An LCD in accordance with a second preferred embodiment of the present invention will now be described with reference to FIG. 4. In the second preferred embodiment, a capacitor electrode 4-3 is further formed in a lower part of the insulator layer to thereby form a capacitor in parallel with the predetermined resistance of the signal resistance block 4-1 through the insulator layer. The capacitor electrode 4-3 may be formed of the same material as the repair line 4.

As described above, the TFT substrate for an LCD in accordance with preferred embodiments of the present invention removes the difference between the optical brightness of all pixels by ensuring that the signal delay of a picture signal transmitted along a normal data line to a designated pixel and the signal delay of a picture signal transmitted along repaired data line to a designated pixel will be the same, by forming a signal delay element such as a signal resistance block at the signal receiving portion of each data line and by additionally forming the auxiliary signal line which can be fused in place of the signal delay element to compensate for the additional signal delay arising from a data line repair operation.

Other embodiments of the invention will be apparent to the skilled in the art from consideration of the specification and practice of the invention disclosed herein. The specification and examples given herein should be considered by those skilled in the art as illustrative only, while the true scope and spirit of the invention is set forth by the following claims.

I claim:

1. A thin film transistor substrate for a liquid crystal display having an active region defined by pixels arranged in rows and columns, said thin film transistor substrate comprising:

a plurality of gate lines which are adapted to be connected to said pixels and to transmit a driving signal to said pixels;

a plurality of data lines which are adapted to be connected to said pixels and to transmit a picture signal to said pixels, said data lines being formed perpendicularly with respect to said gate lines and extending at least between one end of said active region and an opposite end of said active region, each of said data lines including:

a first terminal which is connectable to receive said picture signal, a delay element coupled between said first terminal and a second terminal, said delay element being adapted to provide a predetermined signal delay of said picture signal in said data line, and an auxiliary signal line electrically insulated from said delay element and overlapping said first and second terminals so as to be capable of being electrically shorted between said first and second terminals; and a repair line being adapted to surround said active region and overlapping each of said data lines at both said one end of said active region and said opposite end of said active region so as to be capable of repairing a defective one of said data lines by being electrically shorted to said defective data line at both said ends of said liquid crystal display where it overlaps said defective data line.

2. The thin film transistor substrate defined in claim 1, wherein said delay element is comprised of indium tin oxide.

3. The thin film transistor substrate defined in claim 1, wherein said auxiliary signal line is formed of the same material as said repair line.

4. The thin film transistor substrate defined in claim 1, wherein said auxiliary signal line is formed of a low resistance material.

5. The thin film transistor substrate defined in claim 1, wherein said delay element is comprised of a capacitor electrode formed in parallel with a predetermined resistance.

6. The thin film transistor substrate defined in claim 5, wherein the capacitor electrode is formed of the same material as said repair line.

7. The thin film transistor substrate defined in claim 1, wherein said predetermined signal delay is substantially the same as a signal delay caused when said defective data line is repaired with said repair line.

8. A thin film transistor substrate for a liquid crystal display having at least one display pixel, comprising:

a data line connectable to said display pixel and having a first signal delay;

a repair data line connectable to said display pixel and having a second signal delay different than said first signal delay; and a delay element coupled to said data line which is adapted to provide a predetermined signal delay in said data line which substantially equal to a difference between said first signal delay and said second signal delay.

9. The thin film transistor substrate defined in claim 8, wherein said delay element is comprised of a predetermined resistance.

10. The thin film transistor substrate defined in claim 8, wherein said delay element is comprised of a predetermined resistance and a predetermined capacitance.

11. A thin film transistor liquid crystal display having at least one display pixel, comprising:

a data line connectable to said display pixel and having a first signal delay;

a repair data line connectable to said display pixel and having a second signal delay different than said first signal delay; and a delay element coupled to said data line which is adapted to provide a predetermined signal delay in said data line which substantially equal to a difference between said first signal delay and said second signal delay.

12. The liquid crystal display defined in claim 11, wherein said delay element is comprised of a predetermined resistance.

13. The thin film transistor substrate defined in claim 11, wherein said delay element is comprised of a predetermined resistance and a predetermined capacitance.

* * * * *